(12) United States Patent
Bao

(10) Patent No.: US 11,326,762 B2
(45) Date of Patent: May 10, 2022

(54) COLLIMATING LENS AND LIGHTING DEVICE

(71) Applicant: SIGNIFY HOLDING B.V., Eindhoven (NL)

(72) Inventor: Jing Bao, Shanghai (CN)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/263,282

(22) PCT Filed: Jul. 15, 2019

(86) PCT No.: PCT/EP2019/068953
§ 371 (c)(1),
(2) Date: Jan. 26, 2021

(87) PCT Pub. No.: WO2020/020676
PCT Pub. Date: Jan. 30, 2020

(65) Prior Publication Data
US 2021/0285618 A1    Sep. 16, 2021

(30) Foreign Application Priority Data
Jul. 27, 2018 (WO) ................ PCT/CN2018/097550
Nov. 13, 2018 (EP) .................................... 18205850

(51) Int. Cl.
*F21V 5/04* (2006.01)
*F21V 7/00* (2006.01)
(Continued)

(52) U.S. Cl.
CPC ................ *F21V 5/04* (2013.01); *F21K 9/233* (2016.08); *F21K 9/68* (2016.08); *F21K 9/69* (2016.08);
(Continued)

(58) Field of Classification Search
CPC ............ G02B 19/0061; G02B 19/0066; G02B 19/0028; F21Y 2107/10; F21Y 2103/33;
(Continued)

(56) References Cited

U.S. PATENT DOCUMENTS 6,988,815 B1 * 1/2006 Rizkin ...................... F21V 5/04
362/245
7,600,882 B1 * 10/2009 Morejon ................... F21V 3/00
362/84
(Continued)

FOREIGN PATENT DOCUMENTS

| CN | 202209596 U | 5/2012 | |
| EP | 1826474 A1 | 8/2007 | |
| JP | 5095000 B1 * | 12/2012 | .............. F21V 5/046 |

*Primary Examiner* — Erin Kryukova
(74) *Attorney, Agent, or Firm* — Daniel J. Piotrowski

(57) ABSTRACT

A collimating lens (10) is disclosed that is rotationally symmetric around an axis (15). The lens comprises a first body portion (100) comprising an outer surface (110) having at least one recess (140) arranged to receive a plurality of light sources (5, 5') and an inner surface (120) opposing the outer surface, said inner surface delimiting a cavity (125) and tapering inwardly into the first body portion; and a second body portion (200) extending from the first body portion opposite said cavity and terminating in a light exit window (220), said second body portion having a further outer surface (210) extending between the outer surface of the first body portion and the light exit window and expanding away from the first body portion. Also disclosed is a lighting device that comprises such a collimating lens.

14 Claims, 4 Drawing Sheets

(51) Int. Cl.
    *G02B 19/00*     (2006.01)
    *F21K 9/68*     (2016.01)
    *F21K 9/69*     (2016.01)
    *F21K 9/233*     (2016.01)
    *F21Y 107/10*     (2016.01)
    *F21Y 113/13*     (2016.01)
    *F21Y 115/10*     (2016.01)
    *F21V 23/04*     (2006.01)
    *F21V 8/00*     (2006.01)
    *F21Y 103/33*     (2016.01)

(52) U.S. Cl.
    CPC ........ F21V 7/0091 (2013.01); G02B 19/0028 (2013.01); *F21V 23/045* (2013.01); *F21Y 2103/33* (2016.08); *F21Y 2107/10* (2016.08); *F21Y 2113/13* (2016.08); *F21Y 2115/10* (2016.08); *G02B 6/0061* (2013.01)

(58) Field of Classification Search
    CPC .............. F21Y 2115/10; F21Y 2113/13; F21V 7/0091; F21V 5/04; F21K 9/233; F21K 9/61; F21K 9/68; F21K 9/69
    See application file for complete search history.

(56) References Cited

U.S. PATENT DOCUMENTS

| | | | |
|---|---|---|---|
| 9,416,951 | B1 | 8/2016 | Householder |
| 2008/0170392 | A1* | 7/2008 | Speier ................ G02B 19/0028 362/227 |
| 2009/0116238 | A1 | 5/2009 | Zhu et al. |
| 2010/0149800 | A1* | 6/2010 | Huang ............... G02B 19/0028 362/235 |
| 2012/0002416 | A1 | 1/2012 | Kong et al. |
| 2016/0076739 | A1 | 3/2016 | Hsiao et al. |
| 2017/0138547 | A1 | 5/2017 | Dross |
| 2019/0187445 | A1* | 6/2019 | Stout ................. G02B 19/0066 |

* cited by examiner

COLLIMATING LENS AND LIGHTING DEVICE

CROSS-REFERENCE TO PRIOR APPLICATIONS

This application is the U.S. National Phase application under 35 U.S.C. § 371 of International Application No. PCT/EP2019/068953, filed on Jul. 15, 2019, which claims the benefit of International Application No. PCT/CN2018/097550 and European Patent Application No. 18205850.3, filed on Nov. 13, 2018. These applications are hereby incorporated by reference herein.

FIELD OF THE INVENTION

The present invention relates to a collimating lens that is rotationally symmetric around an axis and that has a lens body for receiving a plurality of light sources such as solid state lighting elements.

The present invention further relates to a lighting device comprising such a collimating lens.

BACKGROUND OF THE INVENTION

With a continuously growing population, it is becoming increasingly difficult to meet the world's energy needs and, simultaneously, to control carbon emissions to kerb greenhouse gas emissions which are considered responsible for global warming phenomena. These concerns have triggered a drive towards a more efficient use of electricity in an attempt to reduce energy consumption.

One such area of concern is lighting applications, either in domestic or commercial settings. There is a clear trend towards the replacement of traditional, relatively energy-inefficient, light bulbs such as incandescent or fluorescent light bulbs with more energy efficient replacements. Indeed, in many jurisdictions the production and retailing of incandescent light bulbs has been outlawed, thus forcing consumers to buy energy-efficient alternatives, e.g. when replacing incandescent light bulbs.

A particularly promising alternative is provided by solid state lighting (SSL) elements, which can produce a unit luminous output at a fraction of the energy cost of incandescent or fluorescent light bulbs. An example of such a SSL element is a light emitting diode (LED). Such SSL elements furthermore benefit from an increased robustness compared to traditional light sources, thereby dramatically increasing their operational lifetime.

However, a major challenge that needs to be addressed for the successful replacement of traditional light sources with lighting devices comprising such SSL elements is to ensure that the luminous output produced by such SSL elements has the desired distribution, e.g. to ensure that the luminous output resembles that of a traditional light source to be replaced. SSL elements tend to produce directional luminous outputs over a limited angular range, e.g. a Lambertian intensity distribution over a range of about 180°. For this reason, SSL elements are typically used in conjunction with optical elements in order to shape the luminous output of the SSL elements. For example, a collimating lens may be used to reduce the beam angle of the luminous output produced by such SSL elements, which for example may be desirable in application domains such as spot lighting and accent lighting.

In some application domains, a single optical element such as a collimating lens may be adapted to receive and shape the luminous output of a plurality of light sources such as SSL elements. For example, in EP 1826474 A1 an optical projector is described comprising a plurality of LED light sources coupled with respective concave reflective surfaces, so that the light beams emitted by the LEDs are reflected by said concave reflective surfaces to obtain reflected light beams leaving the projector. The LEDs are disposed so that their emission axes are substantially radial with respect to a geometric axis of the projector and the concave reflective surfaces are shaped so that the reflected light beams are substantially parallel to the geometric axis of the projector.

In such a design, there is limited mixing of light originating from the different LED light sources. This is not an issue where the different LED light sources are identical. However, in certain application domains such as for example accent lighting, it may be desirable to be able to change the spectral composition of luminous output of the lighting device. This for example may be achieved by optically coupling light sources such as SSL elements producing outputs having different spectral compositions into the optical element such that upon individually controlling such light sources the spectral composition of the overall output of the lighting device can be altered. However, where the optical element does not effectively mix the various outputs having different spectral compositions that when combined create the desired output of the lighting device, the actual output of the lighting device will suffer from colour separation in its luminous output due to the incomplete mixing of the individual output components with different spectral compositions that are generated in spatially distinct locations within the lighting device.

U.S. Pat. No. 9,416,951B1 discloses a lighting apparatus includes a light source. A primary optical surface is configured to receive and redirect light from the light source. A secondary optical surface is configured to receive redirected light from the primary optical surface and further redirect the light in a primary emission direction. The apparatus includes a central opening through the apparatus, the central opening defining a convective path through the apparatus. The primary optical surface is positioned such that a direct view of the light source is obstructed when the apparatus is viewed from the primary emission direction. The primary and secondary optical surfaces are substantially symmetric about the central opening.

SUMMARY OF THE INVENTION

The present invention seeks to provide a collimating lens for collimating the luminous output of a plurality of light sources and effectively mixing these respective luminous outputs.

The present invention further seeks to provide a lighting device comprising such a collimating lens.

According to an aspect, there is provided a collimating lens that is rotationally symmetric around an axis, comprising a first body portion comprising an outer surface having at least one recess arranged to receive a plurality of light sources and an inner surface opposing the outer surface, said inner surface delimiting a cavity and tapering inwardly into the first body portion; a second body portion extending from the first body portion opposite said cavity and terminating in a light exit window, said second body portion having a further outer surface extending between the outer surface of the first body portion and the light exit window and expanding away from the first body portion.

Such a rotationally symmetric collimating lens may have a monolithic lens body comprising the first body portion in which the respective luminous outputs of the light sources are received and the second body portion in which the respective luminous outputs of the light sources are mixed. To this end, the first body portion is shaped such that a part of each luminous output directly enters the second body portion, whilst the remaining part of each luminous output is incident on the inner surface of the first body portion, which inner surface reflects this incident light into the second body portion. In this manner, effective mixing of the respective luminous outputs is achieved such that the collimating lens according to embodiments of the present invention is particularly suitable for use in lighting devices comprising light sources producing outputs of different spectral compositions as the collimating lens ensures that the output of the lighting device is substantially homogeneous in terms of its spectral composition.

The second body portion may have a truncated conical shape in which the truncated cone narrows towards the first body portion. This ensures a particularly effective mixing of the luminous outputs produced by the light sources.

In an embodiment, the outer surface of the first body portion comprises a first surface portion in between the at least one recess and the further outer surface arranged to reflect incident light from the at least one light source onto the further outer surface, wherein the further outer surface is arranged to reflect said light towards the light exit window; and a second surface portion in between the at least one recess and the inner surface arranged to reflect incident light from the at least one light source towards the light exit window via the inner surface. This improves the luminous efficiency of the collimating lens, as light emitted by the lighting devices under relatively large angles (with the optical axis of the light source) is not lost but instead is harvested by the collimating lens and directed towards its light exit window.

To optimize the capture of these portions of the luminous output of the light sources with the first and second surface portions, the first surface portion may taper inwardly from the at least one recess towards the further outer surface and the second surface portion may tapers inwardly from the at least one recess towards the inner surface.

As a further refinement, at least one of the first surface portion, the second surface portion, the inner surface and the further outer surface is faceted to further improve the mixing of the respective luminous outputs of the light sources by the collimating lens. Preferably, each of the first surface portion, the second surface portion, the inner surface and the further outer surface is faceted.

In an embodiment, the at least one recess comprises a groove extending around the first body portion. This has the advantage that a flexible collimating lens design is provided, as the number of light sources to be coupled into the collimating lens may be easily varied due to the fact that the at least one recess is not dedicated to a fixed number of light sources, e.g. a single light source. Such a groove may comprise a convex surface portion opposing the inner surface acting as a collimating lens surface that collimates a portion of the luminous output of the light sources onto the slanted inner surface.

In an alternative embodiment, the rotationally symmetrical lens comprises a plurality of recesses for receiving at least one light source, and wherein the outer surface of the first body portion comprises a plurality of lens portions, each lens portion comprising one of said recesses. Such a collimating lens design may provide greater control over the luminous output beam quality produced with the collimating lens, as the additional lens portions on the outer surface of the first body portion provide additional control over the power of the collimating lens. Each of such lens portions may have a convex outer surface or a truncated conical surface extending from its recess.

The collimating lens may be made of any suitable material. In a particularly advantageous embodiment, the collimating lens is made of an optical grade polymer such as polycarbonate, poly (methyl methacrylate), polyethylene terephthalate, or similar polymers, which allows for the manufacture of the collimating lens in a cost-effective manner, e.g. through molding techniques such as injection molding.

According to another aspect, there is provided a lighting device comprising the collimating lens of any of the herein described embodiments and a plurality of light sources mounted in the at least one recess of the collimating lens. Such a lighting device benefits from the favourable mixing capabilities of the collimating lens such that the lighting device can produce a highly uniform luminous output in terms of its spectral composition.

Preferably, the plurality of light sources comprises solid state lighting elements, wherein different solid state lighting elements may be arranged to emit light having a different spectral composition. SSL elements are preferred because of their small form factor, long life and robustness as explained in more detail above.

In an embodiment, the light sources are individually addressable such that the spectral composition of the luminous output of the lighting device is configurable. This for example is particularly attractive in application domains such as accent lighting, in which changes in the spectral composition of the luminous output of the lighting device, e.g. a tuneable white light accent lighting device or a tuneable coloured light accent lighting device, can add interest to the accent lighting. To this end, the lighting device may comprise a configurable controller arranged to individually address said light sources.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
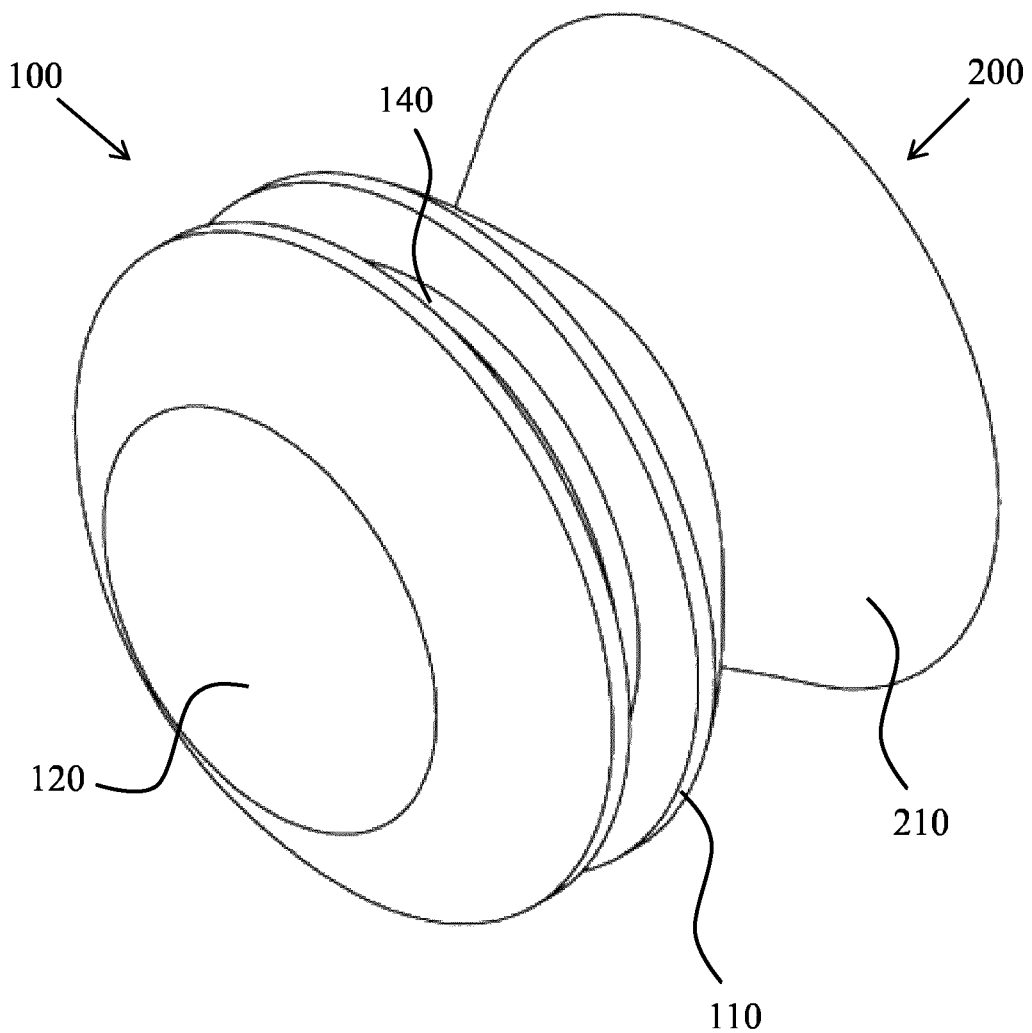
FIG. 1 schematically depicts a perspective view of a collimating lens according to an embodiment.

It should be understood that the Figures are merely schematic and are not drawn to scale. It should also be understood that the same reference numerals are used throughout the Figures to indicate the same or similar parts.

Figure 2:
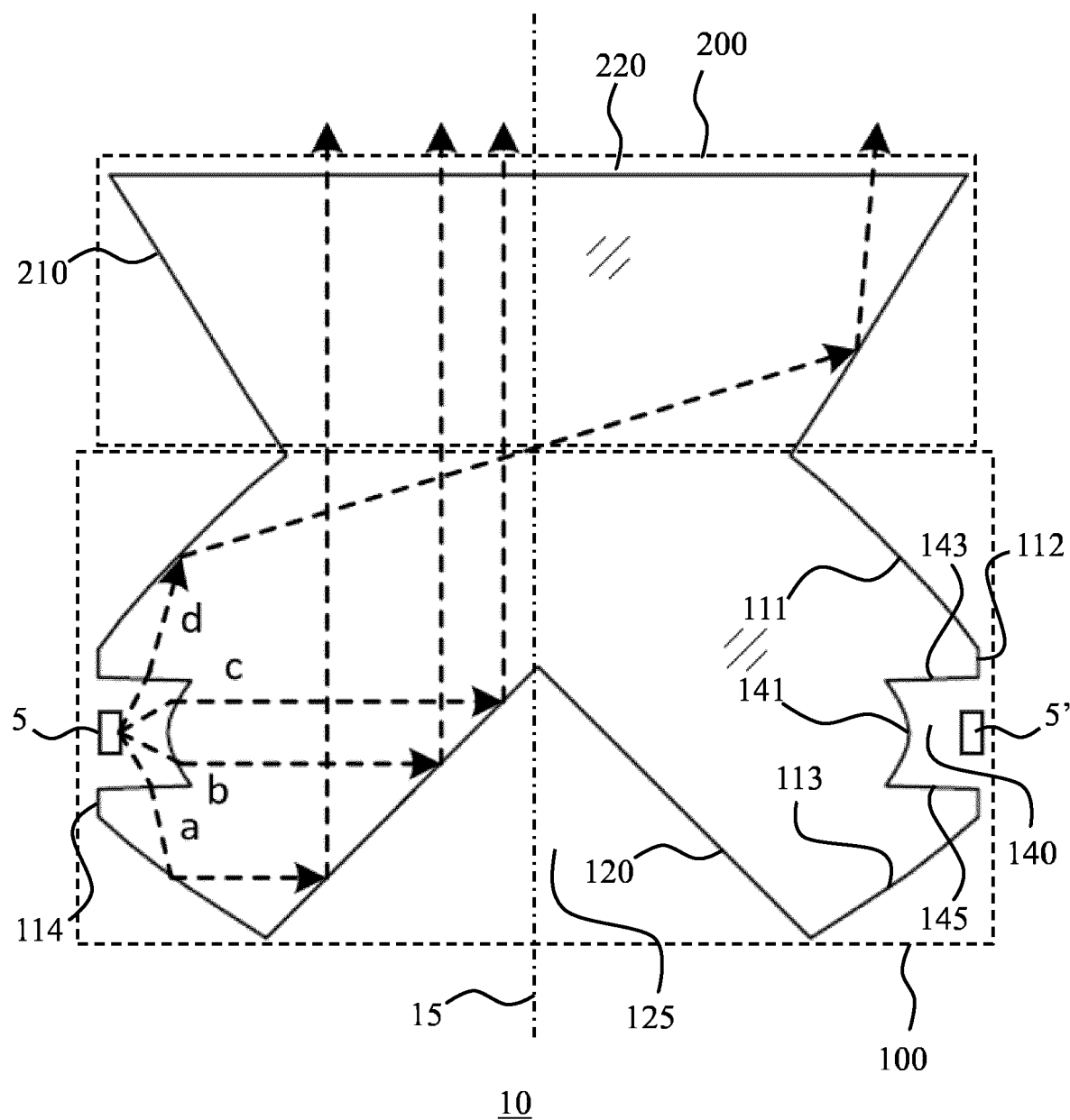
FIG. 2 schematically depicts a cross-sectional view of the collimating lens of FIG. 1.

FIG. 1 schematically depicts a perspective view and FIG. 2 schematically depicts a cross-sectional view of a collimating lens 10 according to an embodiment of the present invention. The collimating lens 10 is a side-lit collimating lens, which reduces the form factor and the cost of the lens. The collimating lens 10 is rotationally symmetric around symmetry axis 15. At this point, it is noted that in the present application, where reference is made to inner and outer surfaces, it should be understood that an inner surface is a surface proximal to the symmetry axis 15 and an outer surface is a surface distal to the optical axis 15. In other words, both inner and outer surfaces of the collimating lens 10 are external surfaces of the lens.

The collimating lens 10 may be a monolithic lens in at least some embodiments and comprises a lens body that can be divided in a first body portion 100 that is adjacent to a second body portion 200. Generally speaking, the first body portion 100 is arranged to receive the luminous output of the plurality of light sources 5, 5' and direct the received luminous output towards the second body portion 200, whereas the second body portion 200 is arranged to mix the luminous output received from the first body portion 100 and produce a mixed luminous output through its surface 220 acting as a light exit window. The second body portion 200 has an outer surface 210 that expands outwardly from the first body portion 100 towards its light exit window 220. For example, the second body portion 200 may have a truncated conical shape in which the light exit window 220 defines the bottom of the cone and the outer surface 210 defines the conical surface that narrows from the bottom of the cone towards the first body portion 100. However, the outer surface 210 is not necessarily a straight generatrix; instead, the outer surface 210 may adopt a curved shape, e.g. a convex or concave shape, i.e. the truncated conical shape of the second body portion 200 may have a curved outer surface.

The first body portion 100 typically comprises an outer surface including a groove-shaped recess 140 arranged to receive the plurality of light sources 5, 5'. Opposing the outer surface 110 is an inner surface 120 that is separated from the outer surface 110 by the lens material of the first body portion 110. The inner surface 120 delimits a cavity 125 that tapers inwardly, i.e. narrows, into the first body portion 110. For example, the cavity 125 may take the form of a (truncated) conical cavity delimited by the inner surface 120. Consequently, the inner surface 120 is angled under a non-zero angle with respect to the symmetry axis 15. The outer surface 110 may extend from the inner surface 120 to the outer surface 210 of the second body portion 200.

The part of the luminous output emitted by the light sources 5, 5' that enters the collimating lens 10 through the surface portion 141 of the recess 140 opposing the light sources 5, 5' may be directed onto the inner surface 120, which acts as a total internal reflection surface for this light. These rays are labelled rays b and c in FIG. 2 and typically define the central portion of the luminous output of the light sources 5, 5'. The inner surface 120 is angled such that such incident light is reflected towards the light exit window 220 of the collimating lens 10. The surface portion 141 of the recess 140 may be a convex surface portion such that this surface portion already imparts a degree of collimation onto the part of the luminous output emitted by the light sources 5, 5' that enters the collimating lens 10 through this surface portion. Alternatively or additionally, the inner surface 120 may be curved to achieve such collimation.

The outer surface 110 of the first body portion 100 may comprise a first surface portion 111 in between the groove-shaped recess 140 and the outer surface 210 of the second body portion 200. The first surface portion 111 is arranged to reflect incident light from the at least one light source 5, 5' onto the outer surface 210 of the second body portion 200. Due to the angled nature of the outer surface 210 of the second body portion 200, this reflected light is further reflected by the outer surface 210 towards the light exit window 220. More specifically, a peripheral portion of the luminous output of the light sources 5,5' indicated as ray d in FIG. 2 may enter the collimating lens 10 through a side surface portion 143 of the groove-shaped recess 140, which side surface portion 143 refracts this peripheral portion of the luminous output onto the first surface portion 111 of the outer surface 110 of the first body portion 100, which in turn reflects these refracted rays onto the outer surface 210 of the second body portion 200, preferably through total internal reflection.

The outer surface 110 of the first body portion 100 may further comprise a second surface portion 113 in between the groove-shaped recess 140 and the inner surface 120 of the first body portion 100. This second surface portion 113 is arranged to reflect incident light from the light sources 5, 5' onto the inner surface 120, which in turn reflects this light towards the light exit window 220 of the collimating lens 10. More specifically, a peripheral portion of the luminous output of the light sources 5,5' indicated as ray c in FIG. 2 may enter the collimating lens 10 through a further side surface portion 145 of the groove-shaped recess 140, which further side surface portion 145 refracts this peripheral portion of the luminous output onto the second surface portion 113 of the outer surface 110 of the first body portion 100, which in turn reflects these refracted rays onto the inner surface 120 of the first body portion 200, preferably through total internal reflection, with the inner surface 120 reflecting this light towards the light exit window 220, preferably through total internal reflection.

In order to achieve the desired reflection with the first surface portion 111 and the second surface portion 113, the first surface portion 111 may taper inwardly from the groove-shaped recess 140 towards the outer surface 210 of the second body portion 200 and the second surface portion 113 may taper inwardly from the groove-shaped recess 140 towards the inner surface 120. The first surface portion 111 may be separated from the groove-shaped recess 140 by a first further surface portion 112 whereas the second surface portion 113 may be separated from the groove-shaped recess 140 by a second further surface portion 114. The further surface portions 112 and 114 may act as spacers and do not necessarily actively contribute to the optical function of the collimating lens 10. Such spacers may be deployed to ensure that the first surface portion 111 and the second surface portion 113 respectively are optimally positioned on the outer surface 110 of the first body portion 100 in terms of optical performance.

It should be understood that in the context of the present application, where reference is made to a tapered surface, this is intended to referred to the surface being angled (relative to the symmetry axis 15) in a particular direction. Specifically, where reference is made to an inwardly tapering surface or surface portion in a particular direction, this is meant to describe a surface or surface portion that is angled towards the symmetry axis 15 in that particular direction. In the context of the present application, the term 'tapered' should not be construed to specifically refer to any variation in thickness.

As will be understood from the foregoing, the collimating lens 10 achieves collimation of the luminous output of the light sources 5, 5' using different surfaces, depending on the angle under which the light sources 5, 5' emit parts of their luminous outputs. More central regions of the luminous output, e.g. rays b and c may be collimated by the surface portion 141 of the groove-shaped cavity 140 and/or the internal surface 120 of the first lens body, whereas more peripheral regions of the luminous output may be collimated through combined internal reflection by the first surface portion 111 of the outer surface 110 of the first body portion 100 and the outer surface 210 of the second body portion 200 (rays a) or through combined internal reflection by the second surface portion 113 of the outer surface 110 of the first body portion 100 and the inner surface 120 of the first body portion 100 (rays d). In this manner, the luminous output of different light sources 5, 5' is effectively mixed within the collimating lens 10, which for example facilitates the generation of a luminous output from the collimating lens 10 that is highly uniform in spectral composition, even where the light sources 5, 5' produce luminous outputs having different spectral compositions.

In order to further improve the mixing efficiency of the collimated lens 10, at least some of the internally reflecting surfaces, the first surface portion 111 and the second surface portion 113 of the outer surface 110 of the first body portion 100, the inner surface 120 of the first body portion 100 and the outer surface 210 of the second body portion 200, may be faceted (not shown). In a preferred embodiment, all these internally reflecting surfaces are faceted to maximize the mixing efficiency of the collimating lens 10.

In the embodiment schematically depicted in FIGS. 1 and 2, the side-lit collimating lens 10 comprises a groove-shaped recess 140 that extends around the entire side of the first body portion 100. This gives great design freedom to a lighting device incorporating such a collimating lens 10 as the light sources 5, 5' may be positioned anywhere within the groove-shaped recess 140, thereby for instance providing flexibility in the number of light sources to be integrated within such a lighting device.

Figure 3:
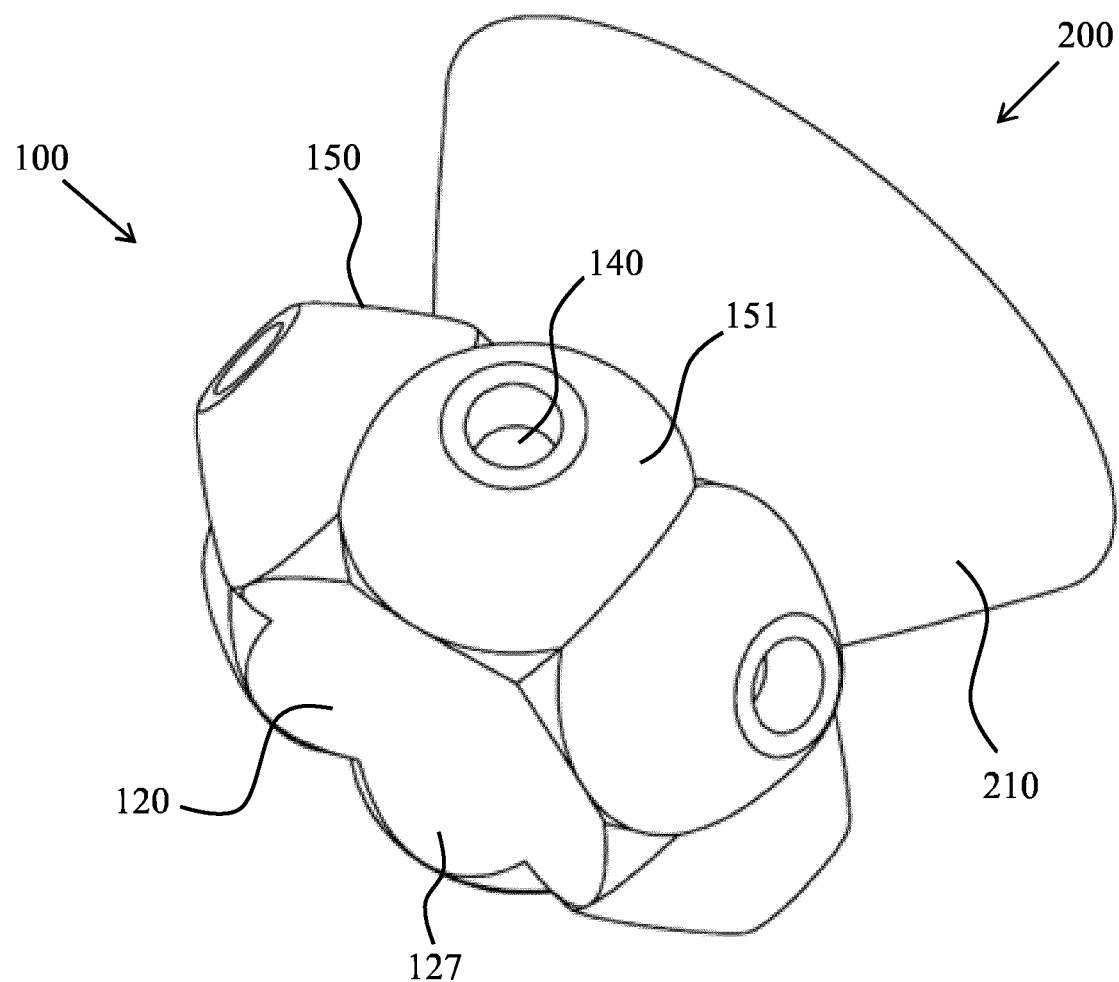
FIG. 3 schematically depicts a perspective view of a collimating lens according to another embodiment.

FIG. 3 schematically depicts a perspective view of an alternative embodiment of the site-lit collimating lens 10 in which the collimating lens 10 comprises a plurality of recesses 140 for receiving at least one light source 5, 5'. In this embodiment, each of the recesses 140 is delimited by a separate lens portion 150 comprising the recess 140, which lens portions 150 extend from the outer surface 110 of the first body portion 100. The lens portions 150 may have an outer surface 151 extending from the recess 140 to the first body portion 100 that either as a convex shape or a truncated conical surface shape in which the outer surface 151 of the lens portion widens towards the first body portion 100. In this embodiment, the inner surface 120 of the first body portion 100 may be formed by a plurality of abutting (truncated) conical surface sections 127. The inclusion of the lens portions 150 increases the optical power of the collimating lens 10 compared to the embodiment of the collimating lens 10 comprising the groove-shaped recess 140, thereby adding increased control over the beam quality produced by the collimating lens 10, in particular over the periphery of a light beam produced by such a collimating lens.

The collimating lens 10 according to embodiments of the present invention may be manufactured in any suitable manner using any suitable material. Preferably, the collimating lens 10 is a monolithic lens made of an optical grade polymer. Examples of optical grade polymers include polycarbonate, poly (methyl methacrylate), polyethylene terephthalate, and so on. In particular, the use of any optical grade polymer that may be moulded into the shape of the collimating lens 10, e.g. through injection moulding or the like, may be contemplated. However, the collimating lens 10 may be made of different materials, e.g. glass or the like.

Figure 4:
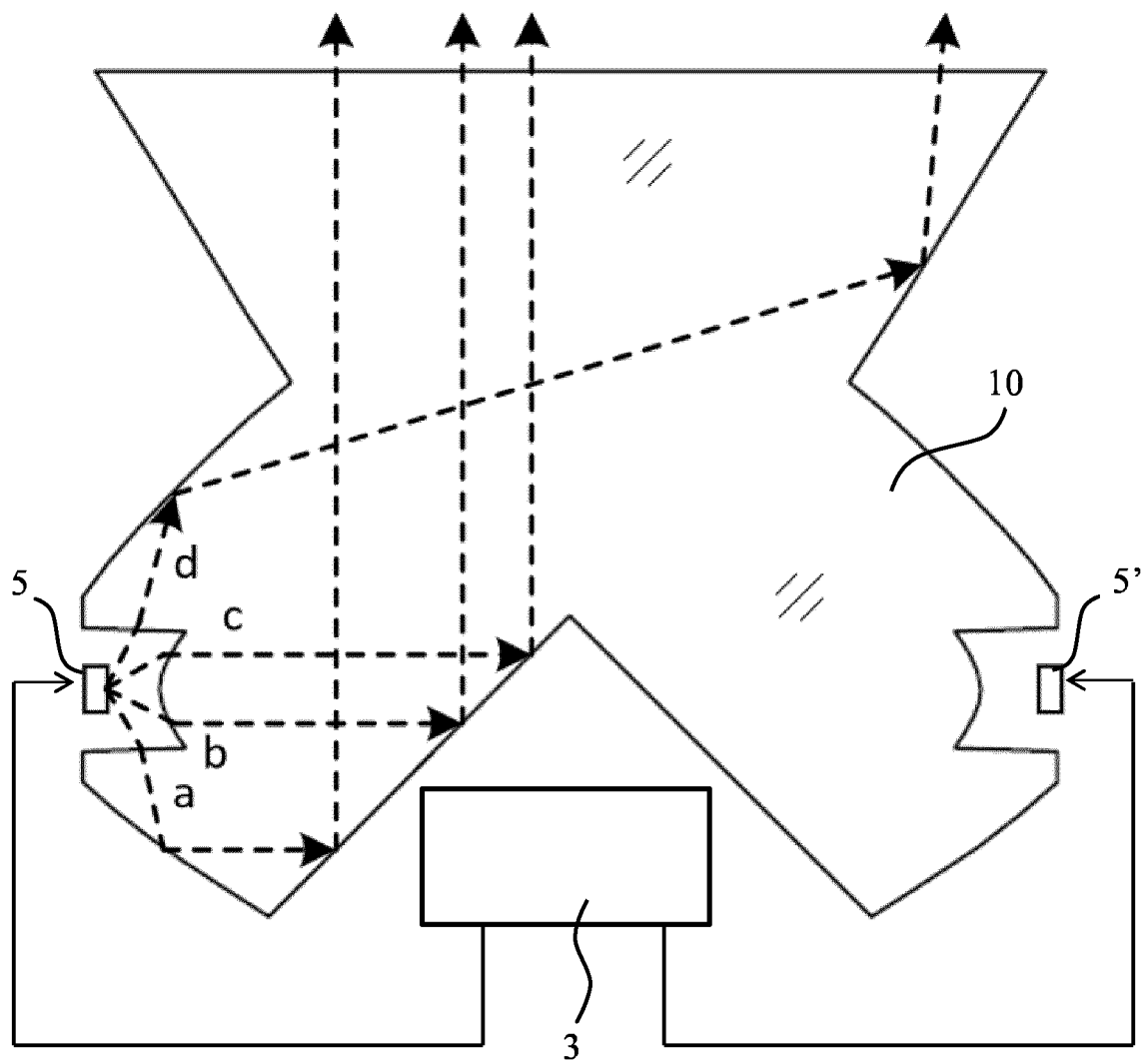
FIG. 4 schematically depicts a cross-sectional view of a lighting device according to an embodiment.

FIG. 4 schematically depicts a lighting device 1 according to an example embodiment. The lighting device 1 comprises the collimating lens 10 of the present invention and a plurality of light sources 5, 5' mounted in the recess 140 of the collimating lens 10. It will be understood that instead of the groove-shaped recess 140 as depicted in FIG. 4, discrete recesses 140 such as in the embodiment of the collimating lens 10 as depicted in FIG. 3 may also be contemplated, in which each recess 140 comprises at least one of the light sources 5, 5'. In a particular embodiment, the light sources 5, 5' are SSL elements, e.g. LEDs. The SSL elements may be identical or may be different to each other in the sense that different SSL elements may produce a luminous output having a different spectral composition. For example, the SSL elements may produce differently coloured luminous outputs, which may be mixed by the collimating lens 10 into a shade of white light.

In an embodiment, the light sources 5, 5', e.g. the SSL elements, may be individually controllable such that the spectral composition of the luminous output exiting the light exit window 220 of the collimating lens 10 may be tuned. For example, where the light sources 5, 5' produce differently coloured luminous outputs, individual control of the light sources 5, 5' can be used to tune the colour temperature of the white light output of the lighting device 1. Alternatively, individual control of the light sources 5, 5' can be used to tune the colour of the light output of the lighting device 1.

To this end, the lighting device 1 may further comprise a controller 3 communicatively coupled to the light sources 5, 5' that may receive a lighting device configuration instruction and control the light sources 5, 5' in accordance with this lighting device configuration instruction. Such control may include switching on/off of selected light sources 5, 5' as well as dimming of selected light sources 5, 5'. The controller 3 may receive the lighting device configuration instruction in any suitable manner. For example, the controller 3 may comprise a wireless communication module (not shown) through which the controller 3 may receive the lighting device configuration instruction, e.g. from a control device such as a dedicated remote control device, a mobile communication device such as a smart phone, tablet computer or the like configured to provide the lighting device configuration instruction in response to user inputs and so on. Any suitable wireless communication protocol such as Bluetooth or Wi-Fi may be used for this purpose. Alternatively, the controller 3 may be communicatively coupled to the power supply of the lighting device 1, in which case the controller 3 may receive the lighting device configuration instruction as a modulation of the power supply. As yet another example, the controller 3 may be coupled in a wired or wireless fashion to a master controller, e.g. a bridge or the like, of a smart (distributed) lighting system through which the controller 3 receives the lighting device configuration instruction. Many other suitable manners of providing the controller 3 with the lighting device configuration instruction will be immediately apparent to the skilled person.

The lighting device 1 may take any suitable shape. In an example embodiment, the lighting device 1 is a luminaire such as an accent lighting luminaire but it should be understood that embodiments of the present invention are not limited to such a particular lighting device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A collimating lens that is rotationally symmetric around an axis, comprising:
   a first body portion comprising an outer surface having at least one recess arranged to receive a plurality of light sources and an inner surface opposing the outer surface, said inner surface delimiting a cavity and tapering inwardly into the first body portion;
   a second body portion extending from the first body portion opposite said cavity and terminating in a light exit window, said second body portion having a further outer surface extending between the outer surface of the first body portion and the light exit window and expanding away from the first body portion;
   wherein the outer surface of the first body portion comprises:
   a first surface portion in between the at least one recess and the further outer surface arranged to reflect incident light from the at least one light source onto the further outer surface, wherein the further outer surface is arranged to reflect said light towards the light exit window; and
   a second surface portion in between the at least one recess and the inner surface arranged to reflect incident light from the at least one light source towards the light exit window via the inner surface.

2. The collimating lens of claim 1, wherein the second body portion has a truncated conical shape.

3. The collimating lens of claim 1, wherein the first surface portion tapers inwardly from the at least one recess towards the further outer surface and the second surface portion tapers inwardly from the at least one recess towards the inner surface.

4. The collimating lens of any claim 1, wherein at least one of the first surface portion, the second surface portion, the inner surface and the further outer surface is faceted.

5. The collimating lens of claim 4, wherein each of the first surface portion, the second surface portion, the inner surface and the further outer surface is faceted.

6. The collimating lens of claim 1, wherein the at least one recess comprises a groove extending around the first body portion.

7. The collimating lens of claim 6, wherein the groove comprises a convex surface portion opposing the inner surface.

8. The collimating lens of claim 1, wherein the rotationally symmetrical lens comprises a plurality of recesses for receiving at least one light source, and wherein the outer surface of the first body portion comprises a plurality of lens portions, each lens portion comprising one of said recesses.

9. The collimating lens of claim 8, wherein each lens portion has a convex outer surface or a truncated conical surface extending from its recess.

10. The collimating lens of claim 1, wherein the lens is made of an optical grade polymer.

11. A lighting device comprising the collimating lens of claim 1 and a plurality of light sources mounted in the at least one recess of the collimating lens.

12. The lighting device of claim 11, wherein the plurality of light sources comprises solid state lighting elements, wherein different solid state lighting elements are arranged to emit light having a different spectral composition.

13. The lighting device of claim 11, wherein the light sources are individually addressable.

14. The lighting device of claim 13, further comprising a configurable controller arranged to individually address said light sources.

* * * * *